United States Patent
Christensen

(10) Patent No.: US 10,781,049 B2
(45) Date of Patent: Sep. 22, 2020

(54) MAGNETIC MATERIAL HANDLER

(71) Applicant: David Christensen, Winamac, IN (US)

(72) Inventor: David Christensen, Winamac, IN (US)

( * ) Notice: Subject to any disclaimer, the term of this patent is extended or adjusted under 35 U.S.C. 154(b) by 0 days.

(21) Appl. No.: 15/987,408

(22) Filed: May 23, 2018

(65) Prior Publication Data

US 2019/0135546 A1 May 9, 2019

Related U.S. Application Data

(60) Provisional application No. 62/524,855, filed on Jun. 26, 2017.

(51) Int. Cl.
*B65G 17/46* (2006.01)
*B65G 17/06* (2006.01)
*B65G 47/84* (2006.01)
*B65G 21/20* (2006.01)

(52) U.S. Cl.
CPC ........... *B65G 17/46* (2013.01); *B65G 17/065* (2013.01); *B65G 21/2036* (2013.01); *B65G 47/843* (2013.01)

(58) Field of Classification Search
CPC .............................. B65G 17/46; B65G 17/065
USPC ...... 198/679, 680, 685, 690.1, 803.6, 803.9, 198/817, 836.1, 836.2
See application file for complete search history.

(56) References Cited

U.S. PATENT DOCUMENTS

| | | | | |
|---|---|---|---|---|
| 4,752,172 A * | 6/1988 | Bolte | ..................... | C25D 13/22 118/423 |
| 6,073,800 A * | 6/2000 | Saito | .................... | H05K 13/028 198/690.1 |
| 6,705,819 B1 * | 3/2004 | Nemoto | ................. | B65G 23/38 221/224 |
| 6,978,877 B2 * | 12/2005 | Spatafora | ................ | B65B 19/28 198/341.01 |
| 7,255,220 B2 * | 8/2007 | Iwai | ....................... | B65G 35/06 104/172.1 |
| 7,581,636 B2 * | 9/2009 | Martinez | ................... | A21B 1/48 198/418.6 |
| 8,794,431 B2 * | 8/2014 | Kobayashi | ......... | B23K 26/0846 198/867.01 |
| 9,027,735 B2 * | 5/2015 | Nakagawa | ........ | H01L 21/67733 198/465.4 |
| 9,393,732 B2 * | 7/2016 | Winzinger | .............. | B29C 49/06 |
| 9,540,127 B2 * | 1/2017 | Papsdorf | ................. | B65B 35/44 |
| 10,184,172 B2 * | 1/2019 | Liu | ......................... | C23C 14/35 |

* cited by examiner

*Primary Examiner* — Douglas A Hess
(74) *Attorney, Agent, or Firm* — Daniel Zamudio

(57) ABSTRACT

A material handler that uses chain driven magnetic plates to create a magnetic surface. The magnetic surface undulates and is able to lift ferrous material such as metal cans. The handler allows metal cans that are palletized to be removed quickly and easily.

5 Claims, 4 Drawing Sheets

MAGNETIC MATERIAL HANDLER

CROSS-REFERENCE TO RELATED APPLICATIONS

The present application claims the benefit of U.S. Provisional Patent Application No. 65/524,855 filed Jun. 26, 2017, the entirety of which is hereby incorporated by reference, including its specification.

BACKGROUND

Conveyors are used for handling material. They can be used for a multitude of applications. One particular application is the loading or unloading of product, canned goods for example, from pallets. The speed with which this is done is slow. There is a need in the industry for a process that is faster.

Chain drives are widely used for the transmission of power where drive shafts are separated at distances greater than that for which gears alone are practical. In such cases, sprockets (wheels with teeth shaped to mesh with a chain) take the place of gears and drive one another by means of a chain passing over the sprocket teeth. The chains used in conveyor belt systems are commonly block chains, and consist of solid or laminated blocks connected by side plates and pins. The blocks engage with teeth on sprocket wheels. Depending on the material being moved, bulky and inconvenient buckets, hooks, or other devices are connected to the blocks to do lifting or moving of workpieces.

There is a need in the industry for an apparatus that is easy to use, relatively inexpensive, and assists humans in loading and unloading palletized material, such as the unloading and loading of canned goods and conveying these goods over large distances.

SUMMARY

The present invention is directed to an apparatus that satisfies this need. The apparatus comprises an intermediate conveyor belt that is surrounding a manipulator conveyor belt. A conveyor with a plurality of holders attached to the conveyor. An unloader and at least one workpiece being handled by the handler and received by the unloader. Embodiments of the present invention can be configured in such a way as to account for three-hundred and sixty degree side load forces.

The apparatus is used to more rapidly load and unload material from pallets, such as metal canned goods, to name one example.

An embodiment of the present invention uses magnetic plates or bars as holders of the metal cans. It magnetically attaches to metal material from one area and disengages the material after moving, via a conveyor type activity, the material to another area. Such an embodiment rapidly loads and unloads ferrous material from pallets, or the like, and onto or off of processing machinery or other conveyor belts to move the material further down a processing line. The invention best operates with ancillary equipment, such as an external conveyor, for the handling of product. It is desirable that the equipment have a means to attract and later release the material and smoothly moving the canned goods from the invention to the ancillary equipment.

The magnetic bars have two ends and are connected at each end to a different chain. The chains being driven by a gear or drive shaft. Ideally, such a chain driver could control slack in the chains. In this manner, the bars connect the chains to one another and create a magnetic surface that spans between the chains.

Attaching the holders to the chains is done via bearings that allow for movement of the bars away from the chains and back again with the forces of gravity. One portion of the bearing, or bushing, is connected to the chain at a chain linkage. Another portion of the bushing has a hole through which a rod can slide to and fro. The magnetic bars are connected to the rods, which are slidably connected to the bushing. Because of this means of connecting, the magnetic bars are able to change from a position near to the chain to a position distal to the chain. I envision the magnetic bars being proximal to the chain linkages when the chain is at its highest level of travel, and distal when the chain is at its lowest level of travel. Gravity is a force that works to move the magnetic bars this way.

In one embodiment of the present invention, holders house magnets, such as those made from neodymium. The magnets being attached inside the channel of the holder in a position as required for the particular application. The holders can have a channel with a magnetic design that acts as a magnetic shield for a permanent magnetic circuit created by a plurality of bars.

In another embodiment of the present invention, there is a conveyor belt traveling between the magnetic bars and workpieces, e.g. metal cans. The conveyor belt travels within the magnetic field created by the bars. In a best mode the conveyor belt is made from interwoven polyester urethan or like material. This conveyor belt could move along substantially synchronously with the chains or run independently of the chains. Regardless, it acts as a cushion between the material being handled and the magnetic bars. Now, the conveyor belt can be positioned such that its length is greater than that of the chains and thereby acts as a means to detach the metal cans being magnetically held. The detaching can be done with or without the assistance of a stripper bar, however I envision a wedge being used to break the cans from the magnetic hold of the magnetic bars. The wedge works by inserting itself between the invention and the workpiece causing the workpiece to separate from the plurality of magnetic bars.

In yet another embodiment of a mechanically automated conveyor system configured to pick and place containers, such as cans used on food processing systems, the conveyor system has a conveyor chain. A sprocket engages with the conveyor chain and is configured to engage links of the conveyor chain in an up-facing position and then to turn the conveyor chain from the up-facing position to a down-facing position as the links disengage from the sprocket. Similar to the action involved in a pedal, sprocket and chain of a bicycle.

The embodiment has a plurality of magnet holders, these are heavy iron pieces that are rectangularly shaped. Each magnet holder being slidably attached to a link of the conveyor chain and configured to slide, under control of gravity, towards the respective link when the respective link is in the up-facing position. Each magnet holder is also configured to slide, under control of gravity, away from the respective link when the respective link is in the down-facing position.

There is a chain driver configured to drive the conveyor chain such that the conveyor chain engages and disengages from the sprocket and a bar restrictor extending partially around the conveyor chain and the sprocket. The restrictor is spaced apart from the sprocket. The restrictor is configured so as to retain a magnet holder proximal the chain while the conveyor chain transitions from the up-facing position to the down-facing position until the magnet holder passes an end of the restrictor. So the magnet holders pass around the sprocket and are held against the chain until they are in the down facing position when the holders would normally slide in their bearing that holds them to the chain link. Once they pass the restrictor, they drop and are available to magnetically lift cans that are in the range of the holders.

I envision this embodiment having a bearing connected to one or more links of the conveyor chain. The bearing would include a sliding rod that is connected to a respective magnet holder. The sliding rod is configured to limit movement of the magnet holder between a position proximal to the conveyor chain and a position distal the conveyor chain. Of course, the embodiment would have a frame supporting the sprocket and which is configured to position the end of the restrictor with respect the containers, such as food cans, such that a magnet holder passing the end of the restrictor slides away from the conveyor chain and magnetically attaches to the container. Additionally, there is another conveyor belt that is located so that its travel is between the magnet holders, in the down position, and the cans. This allows for adjusting the strength of the magnetic file don the cans because the conveyor belt is inserted in the magnetic field keeping the cans slightly further away from the magnet holders.

In yet another embodiment there is a mechanically automated conveyor system configured to pick and place containers, the conveyor system comprising a conveyor chain extending between a first sprocket and a second sprocket. The first sprocket configured to engage links of the conveyor chain in an up-facing position and to turn the conveyor chain from an up-facing position to a down-facing position as the links disengage from the first sprocket.

The embodiment has a plurality of magnet holders, each being slidably attached to a link of the conveyor chain. The magnet holders are configured to slide, under control of gravity, towards the respective link when the respective link is in the up-facing position and to slide, under control of gravity, away from the respective link when the respective link is in the down-facing position. Each magnetic holder is made to magnetically attach to a container below the conveyor chain when the magnet holder is distal the conveyor chain.

This embodiment has a chain driver configured to drive the conveyor chain to engage the first sprocket and move from the first sprocket towards the second sprocket. There is a bar restrictor extending partially around the conveyor chain and the first sprocket. The restrictor being spaced apart from the first sprocket and configured to retain a magnet holder proximal the chain while the chain transitions from the up-facing position to the down-facing position until the magnet holder passes an end of the restrictor.

In this embodiment I have a wedge positioned proximal the second sprocket and configured to extricate the container magnetically attached to the magnet holder attached to the conveyor chain. The wedge is attached to the frame, in the best mode, by a strong weld. However, the wedge need only be near enough to break the magnetic hold that the magnetic holders have on the containers, e.g. food cans.

A method embodiment of the invention uses steps for picking and placing containers with a conveyor system, the conveyor system including a conveyor chain engaged with a sprocket, a plurality of magnet holders, each magnet holder slidably connected to a respective link of the conveyor chain, each magnet holder sliding between a first position proximal to the respective link and a second position distal to the respective link, a chain driver configured to drive the sprocket such that the conveyor chain engages the sprocket with links in an up-facing position and disengages from the sprocket with the links in a down-facing position, and a bar restrictor extending partially around the sprocket and configured to retain a magnet holder proximal the conveyor chain while the chain transitions from the up-facing position to the down-facing position until the magnet holder passes an end of the restrictor, the conveyor chain engaging the sprocket medial the sprocket and the restrictor. Though not necessary, I envision in the best mode that this embodiment would have a conveyor belt that travels between the magnetic holder and the containers when the chain is in the down-facing position. This causes material to be inserted between the containers and the magnet holders and regulates the strength of the magnetic hold that is on the containers.

This method embodiment comprises 1) rotating the sprocket such that the conveyor chain engages the sprocket in an up-facing position and disengages from the sprocket in a down-facing position; 2) positioning the end of the restrictor with respect to a container below the conveyor chain such that a magnet holder passing the end of the restrictor slides to the second position and magnetically attaches to the container; and 3) moving the container attached to the magnet holder with the conveyor chain.

Another method embodiment of the present invention is to process according to the steps whereby conveyors are in a static mode. A magnetic circuit is downward but free floating bars are momentarily suspended by a rack system and installed actuator (pneumatic, hydraulic, electric). Then Ferrous Material (such as metal can product) is lifted to the flat belt drive assembly or the magnet conveyor can be lowered to the product. The flat belt is between the magnets and the product. The flat belt also acts as a curtain to inhibit product from both jumping to the magnet circuit or falling from the manufacturing process. Redundant internal switches or sensors once made will release the rack system (actuator cycles), thus lowering the magnetic bars housing the permanent magnetic circuit. The circuit it attracted to the ferrite material and the conveyor lifts, or an in feed lift conveyor drops. The conveyor drive motor starts to turn, the chain drive magnetic bar assembly starts to rotate, the flat belt drive starts to turn in sequence with the chain assembly, and the product moves with the assembly. Product is separated from the magnetic conveyor when the magnet bars (attached to the chain) start to rotate around the drive sprockets and turn upward. At that point of the pitch rise (opening between the magnet bars and the flat belt of the chain assembly) is where the stripper knife is installed. This permanent barrier restricts the attraction the product has with the magnetic bars. This drastic air gap enables the product to fall to the external exit conveyor. Again, the exit conveyor runs at an equal RPM as the magnet conveyor. It also has a magnetic transition plate installed for easier product attraction to it. As the free flowing magnetic circuit bars are rotated upward inversely, gravitational force allow them to detent downward. They are held in the down position by a fixed saddle guide track as they rotate downward on the idler shaft sprocket. The saddle helps to put the bars back into the suspended rack position. The chain senses a home position and stops the conveyor movement. The magnetic field can also be broken by pitching the drive sprocket upward, but I find the wedge works best.

One exception to this process is where the magnetic conveyor has to lower and raise to transition product. Then a heavier duty actuator is now needed to raise the magnetic bars up to strip off product.

BRIEF DESCRIPTION OF THE SEVERAL VIEWS OF THE DRAWINGS

These and other features, aspects and advantages of the present invention will become better understood with regard to the following description, appended claims, and accompanying drawing where:

DESCRIPTION

Overview.

Figure 1:
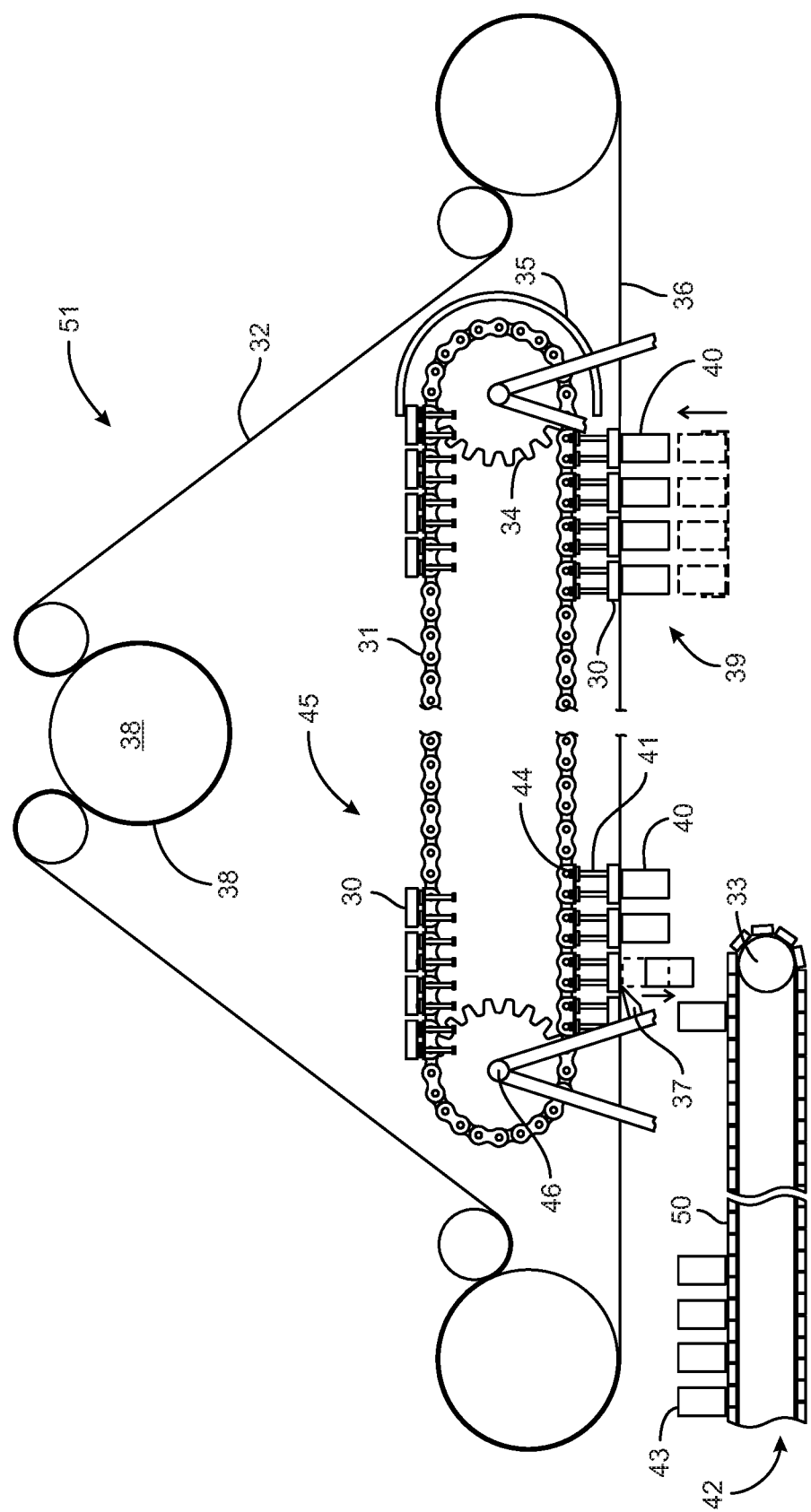
FIG. 1 shows a front view of one embodiment of the invention.

As shown in FIG. 1, a front view of one embodiment of the invention comprises a first conveyor system 45 having a plurality of magnetic bars 30 and at least one chain 31. Each of the magnetic bars 30 being slidably attached to at least one bearing 44. The at least one bearing 44 being attached to the at least one chain 31. The at least one chain 31 being driven by a driver 34. The driver 34 supported by a frame 46. A guide 35 assists to position the magnetic bars 30 into a position for working on ferrous material 40. The plurality of magnetic bars 30 emit a magnetic field and lift ferrous material 40 from one location 39 and drop the material 43 off at another location 42 onto another machine for further processing 50, such as a conveyor belt 33. The stripper bar 37 assists in releasing the ferrous material 40 from the magnetic bars 30. A second belt driver system 38 causes a conveyor belt 32 to travel and insert itself between 36 the plurality of magnetic bars 30 and the material being handled 40.

The attachment of the magnetic bars 30 to the at least one bearing 44 are done via a bar 41. The bar is able to slide through a hole in the at least one bearing 44. This allows the magnetic bars 30 to be held against the chain 31 by the guide 35 and subsequently drop under the weight of gravity when the guide 35 is no longer exerting force against the magnetic bars 30.

Figure 2:
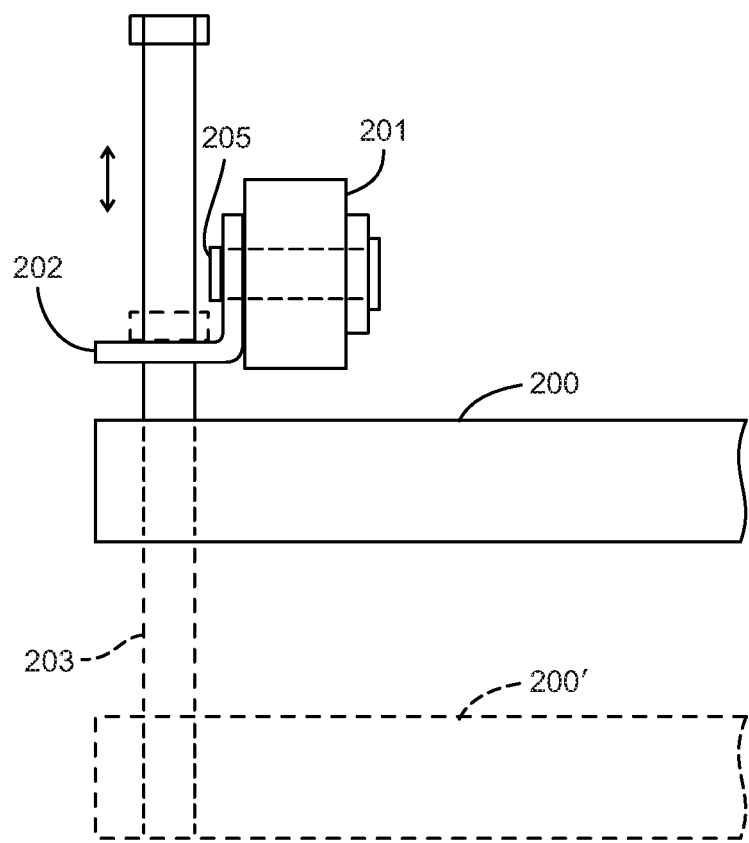
FIG. 2 shows a front view of one embodiment of the invention's bushing mechanism.

As shown in FIG. 2, a front view of one embodiment of the invention's bushing mechanism comprises a holder 200 that is integrally attached to a rod 203. A bushing 202 receives the rod 203 which slidably passes through a hole in the bushing 202. The bushing 202 is fixedly attached, via a bolt 205, to a chain link 201. The sliding action of the rod 203 allows the holder 200 to be in alternate positions 200'.

Figure 3:
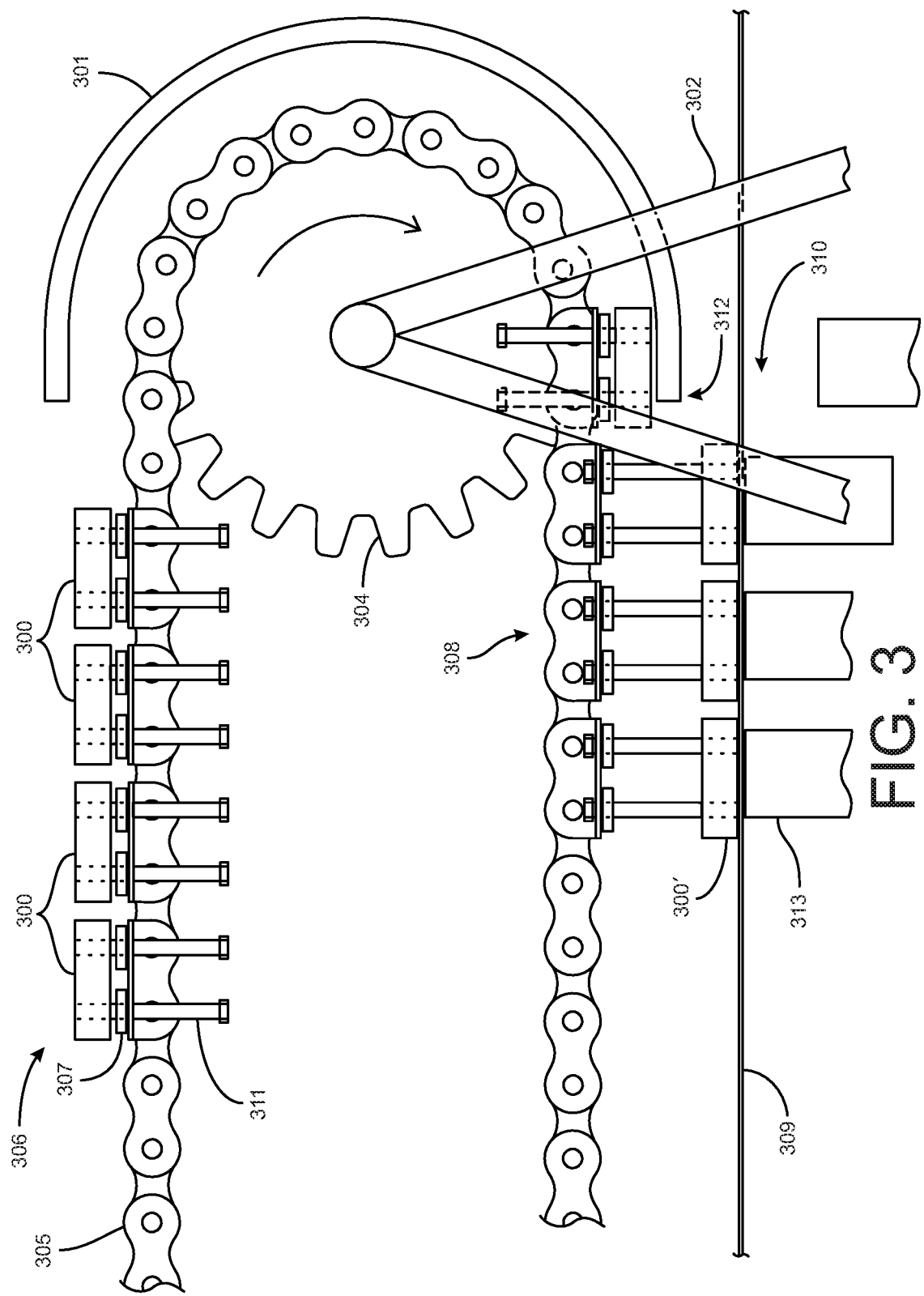
FIG. 3 shows a front partial view of one embodiment of the invention.

As shown in FIG. 3, a front partial view of one embodiment of the invention comprises a first conveyor 306. The first conveyor having a chain 308. A plurality of bushings 307 are fixedly attached to the chain 305. There are a plurality of holders 300 that are attached to a plurality of rods 311 that pass through holes in the bushings 307.

As a drive gear 304 which engages the chain 305 and is supported by a sturdy frame 302 moves in direction X the movement of the chain causes the holders to move in the same direction. A restrictor 301 exerts pressure against the holder 300 and restricts their movement away form the chain 305. Once the moving chain and holders pass a point where the restrictor ends 312 the holders 300' will drop into a new position 308 that is away from the chain 305. The holders magnetically lift ferrous workpieces 313 as shown at 310. A second conveyor (not shown) driving a second conveyor belt 309 creates a surface between the magnetic holders 300' and the workpieces 313 to allow for controlling the magnetic strength of the holders.

Figure 4:
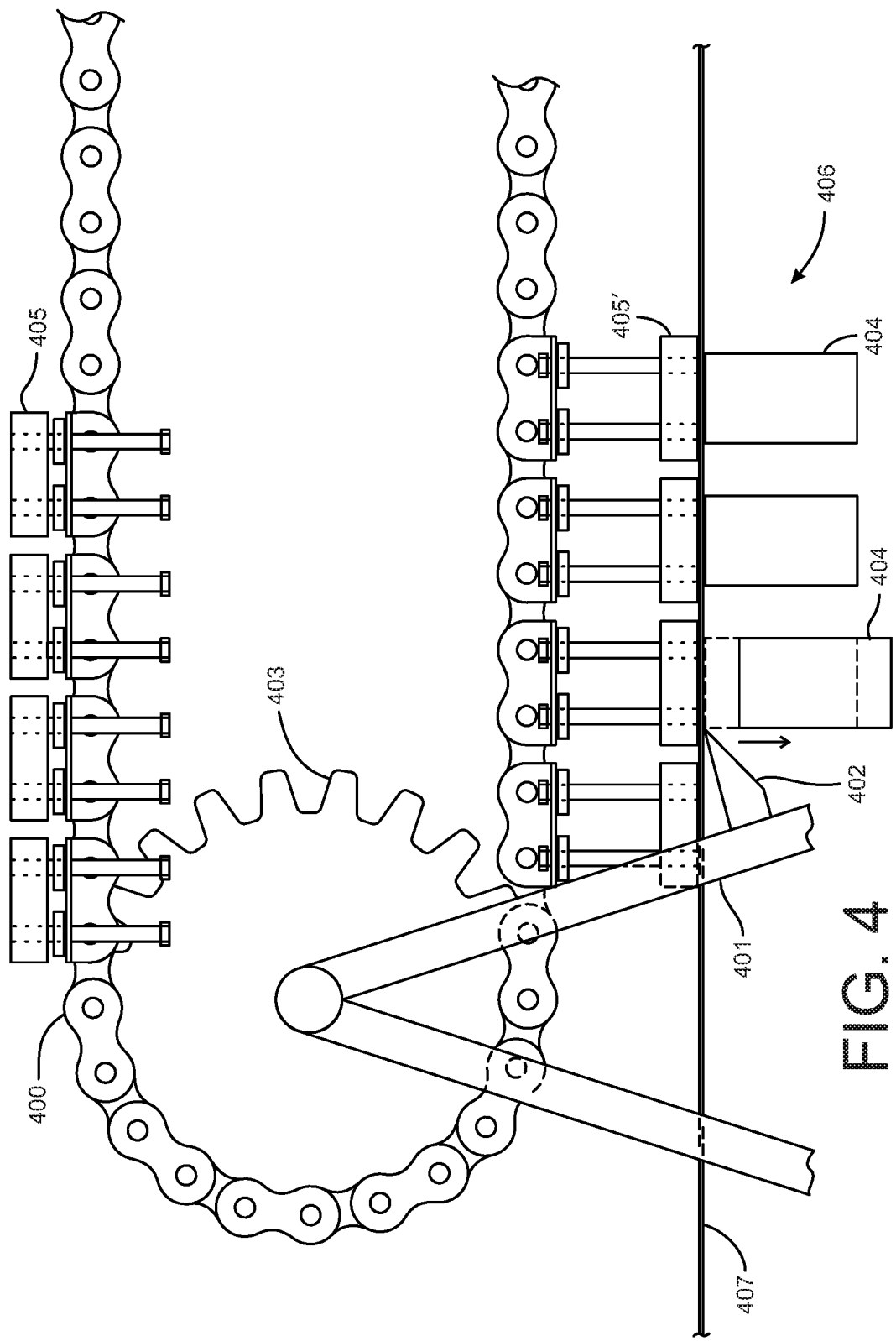
FIG. 4 shows a different front partial view of one embodiment of the invention.

As shown in FIG. 4, a different front partial view of one embodiment of the invention comprises a chain 400 and a drive 403. A frame 401 that supports the drive 403. The chain is rotated by and engaged with the drive. The magnetic holders 405 that are connected to the chain and move with the chain are shown in a proximal position 405 and in a position distal from the chain 405'. The are metal cans 404 that are attracted to and becoming magnetically attached 406 to the holders 405'. A knifelike wedge 402 inserting between the cans 404 and a conveyor belt surface 407 that is located between the cans 404 and the holders 405'. The cans 404 are released from the magnetic holders 405' to be collected.

Although the present invention has been described in considerable detail with the reference to certain preferred versions thereof, other versions are possible. For example, the bushings may attach to the holder in many configurations, the chain could be a belt of some sort, and the restrictor might be a separate stand alone device that is near to the frame rather than attached to the framer. Therefore, the spirit and scope of the appended claims should not be limited to the description of the preferred versions contained herein.

Any element in a claim that does not explicitly state "means for" performing a specified function, or "step for" performing a specific function, is not to be interpreted as a "means" or "step" clause as specified in 35 U.S.C. § 112, ¶6.

What I claim is:

1. A mechanically automated conveyor system configured to pick and place containers, the conveyor system comprising:
    a conveyor chain;
    a sprocket engaged with the conveyor chain, the sprocket configured to engage links of the conveyor chain in an up-facing position and to turn the conveyor chain from the up-facing position to a down-facing position as the links disengage from the sprocket;
    a plurality of magnet holders, each magnet holder being slidably attached to a link of the conveyor chain, each magnet holder configured to slide, under control of gravity, towards the respective link when the respective link is in the up-facing position and to slide, under control of gravity, away from the respective link when the respective link is in the down-facing position;
    a chain driver configured to drive the conveyor chain such that the conveyor chain engages and disengages from the sprocket; and
    a bar restrictor extending partially around the conveyor chain and the sprocket, the restrictor being spaced apart from the sprocket, the restrictor configured to retain a magnet holder proximal the chain while the conveyor chain transitions from the up-facing position to the down-facing position until the magnet holder passes an end of the restrictor.

2. The conveyor system of claim 1, further comprising a bearing connected to one or more links of the conveyor chain, the bearing including a sliding rod connected to a respective magnet holder, the sliding rod configured to limit movement of the magnet holder between a position proximal to the conveyor chain and a position distal the conveyor chain.

3. The conveyor system of claim 1, further comprising a frame supporting the sprocket, the frame configured to position the end of the restrictor with respect to a container such that a magnet holder passing the end of the restrictor slides away from the conveyor chain and magnetically attaches to the container.

4. The conveyor system of claim 1, further comprising a second conveyor belt that is located between the magnetic holder and the containers when the link is in the down-facing position.

5. A method of picking and placing containers with a conveyor system, the conveyor system including a conveyor chain engaged with a sprocket, a plurality of magnet holders, each magnet holder slidably connected to a respective link of the conveyor chain, each magnet holder sliding between a first position proximal to the respective link and a second position distal to the respective link, a chain driver configured to drive the sprocket such that the conveyor chain engages the sprocket with links in an up-facing position and disengages from the sprocket with the links in a down-facing position, and a bar restrictor extending partially around the sprocket and configured to retain a magnet holder proximal the conveyor chain while the chain transitions from the up-facing position to the down-facing position until the magnet holder passes an end of the restrictor, the conveyor chain engaging the sprocket medial the sprocket and the restrictor, the method comprising:

rotating the sprocket such that the conveyor chain engages the sprocket in an up-facing position and disengages from the sprocket in a down-facing position;

positioning the end of the restrictor with respect to a container below the conveyor chain such that a magnet holder passing the end of the restrictor slides to the second position and magnetically attaches to the container; and moving the container attached to the magnet holder with the conveyor chain.

\* \* \* \* \*